(12) United States Patent
Huang et al.

(10) Patent No.: US 10,151,903 B2
(45) Date of Patent: Dec. 11, 2018

(54) TELEPHOTO LENS

(71) Applicant: ZHEJIANG SUNNY OPTICS CO., LTD., Ningbo, Zhejiang (CN)

(72) Inventors: Lin Huang, Zhejiang (CN); Faguan Lin, Zhejiang (CN)

(73) Assignee: ZHEJIANG SUNNY OPTICS CO., LTD., Ningbo, Zhejiang (CN)

( * ) Notice: Subject to any disclaimer, the term of this patent is extended or adjusted under 35 U.S.C. 154(b) by 0 days.

(21) Appl. No.: 15/542,435

(22) PCT Filed: May 20, 2016

(86) PCT No.: PCT/CN2016/082756
§ 371 (c)(1),
(2) Date: Jul. 9, 2017

(87) PCT Pub. No.: WO2017/161661
PCT Pub. Date: Sep. 28, 2017

(65) Prior Publication Data
US 2018/0045923 A1   Feb. 15, 2018

(30) Foreign Application Priority Data
Mar. 23, 2016 (CN) .......................... 2016 1 0168621

(51) Int. Cl.
*G02B 13/18* (2006.01)
*G02B 3/02* (2006.01)
(Continued)

(52) U.S. Cl.
CPC ............... *G02B 13/02* (2013.01); *G02B 9/34* (2013.01)

(58) Field of Classification Search
CPC .......... G02B 13/004; G02B 9/34; G02B 9/36; G02B 13/04; G02B 9/56
(Continued)

(56) References Cited

U.S. PATENT DOCUMENTS 7,688,523 B2   3/2010   Sano
7,755,851 B2   7/2010   Park et al.
(Continued)

FOREIGN PATENT DOCUMENTS

CN   101266328 A   9/2008
CN   101377564 A   3/2009
(Continued)

OTHER PUBLICATIONS

Chinese Office Action dated Aug. 16, 2017 for Chinese Application No. 201610168621.X, filed Mar. 23, 2016.
(Continued)

*Primary Examiner* — William Choi
(74) *Attorney, Agent, or Firm* — David D. Brush; Westman, Champlin & Koehler, P.A.

(57) ABSTRACT

A telephoto lens includes, from an object-side to an image-side: a first lens having a positive refractive power, wherein an object-side surface of the first lens is convex, an image-side surface of the first lens is convex; a second lens having a refractive power; a third lens having a refractive power, wherein the third lens includes plastic material, each of an object-side and an image-side surface of the third lens is aspheric; a fourth lens having a refractive power, wherein an object-side surface of the fourth lens is convex, the fourth lens includes plastic material, and each of the object-side and image-side surfaces of the fourth lens is aspheric; wherein, the telephoto lens satisfies: 0.7<TTL/f<0.95, and |f4/f|≥1.2; where TTL is distance from the first lens' object-side surface to an imaging plane; f is effective focal length of the telephoto lens, and f4 is effective focal length of the fourth lens.

10 Claims, 11 Drawing Sheets

(51) Int. Cl.
*G02B 9/34* (2006.01)
*G02B 13/02* (2006.01)

(58) Field of Classification Search
USPC .................................. 359/715, 753, 772–775
See application file for complete search history.

(56) References Cited

U.S. PATENT DOCUMENTS

| | | | |
|---|---|---|---|
| 2007/0081259 A1 | 4/2007 | Noda | |
| 2009/0109552 A1* | 4/2009 | You | G02B 9/34 359/772 |
| 2015/0116569 A1 | 4/2015 | Mercado | |

FOREIGN PATENT DOCUMENTS

| | | |
|---|---|---|
| CN | 102483513 A | 5/2012 |
| CN | 104597586 A | 5/2015 |
| CN | 104597587 A | 5/2015 |
| CN | 104635320 A | 5/2015 |
| JP | H052132 A | 1/1993 |
| JP | H10186227 A | 7/1998 |
| JP | 2010060835 A | 3/2010 |

OTHER PUBLICATIONS

English Translation of Chinese Office Action dated Aug. 16, 2017 for Chinese Application No. 201610168621.X, filed Mar. 23, 2016.
International Search Report and Written Opinion dated Dec. 20, 2016 for corresponding International Application No. PCT/CN2016/082756, filed May 20, 2016.
English translation Written Opinion posted Jul. 6, 2018, for corresponding International Application No. PCT/CN2016/082756, filed May 20, 2016.

* cited by examiner

TELEPHOTO LENS

CROSS-REFERENCE TO RELATED APPLICATION

This Application is a Section 371 National Stage Application of International Application No. PCT/CN2016/082756, filed May 20, 2016, and published as WO 2017/161661 A1, on Sep. 28, 2017, which claims priority to and benefits of Chinese Patent Application Serial No. 201610168621.X, filed with the State Intellectual Property Office of P. R. China on Mar. 23, 2016, the entire contents of which are incorporated herein by reference.

FIELD

The present disclosure relates to a field of camera shooting, and more particularly to a small-sized telephoto lens.

BACKGROUND

With increasing uses of miniaturized electronic products such as mobile phones and tablets, requirements for various functions of image acquisition become increasingly higher and adopting a dual-lens module has been a tendency. Compared with a single performance of a general imaging lens, the dual-lens module may meet the requirements for a wide angle shooting and the requirements for a long-focus shooting at the same time. In the meantime, the electronic products become thinner with a smaller volume for satisfying the market requirements. Therefore the dual-lens module which is applied in the electronic products may also satisfy the miniaturization, as well as have a wider zoom range and a good imaging performance.

SUMMARY

Embodiments of the present disclosure seek to solve at least one of the problems existing in the related art to at least some extent. For that reason, a telephoto lens is provided by the present disclosure.

A telephoto lens, in sequence from an object side to an image side includes:
- a first lens having a positive refractive power, in which an object-side surface of the first lens is a convex surface, an image-side surface of the first lens is a convex surface;
- a second lens having a refractive power;
- a third lens having a refractive power, in which the third lens is made of a plastic material, each of an object-side surface and an image-side surface of the third lens is an aspheric surface;
- a fourth lens having a refractive power, in which an object-side surface of the fourth lens is a convex surface, the fourth lens is made of a plastic material, and each of the object-side surface and an image-side surface of the fourth lens is an aspheric surface;

in which, the telephoto lens satisfies the following relations:

$0.7 < TTL/f < 0.95$; and $|f4/f| \geq 1.2$;

in which, TTL denotes a distance from the object-side surface of the first lens to an imaging plane along an axis; f denotes an effective focal length of the telephoto lens, and f4 denotes an effective focal length of the fourth lens.

The telephoto lens satisfying the above-mentioned configuration may be applied to a dual-lens module, and may implement a long-focus characteristic, has a small depth of field, thus highlighting a theme and blurring out a background, which means that the telephoto lens is appropriate to shoot a farther object, thereby acquiring a sharp image. Each optical aberration is corrected effectively, a higher resolution is implemented, miniaturization is ensured, a larger magnification may be acquired if a wide-angle lens is combined, and requirements are satisfied.

In an embodiment, the second lens has a negative refractive power, and the third lens has a negative refractive power.

In an embodiment, the telephoto lens satisfies the following relation: $-0.7 \leq f1/f3 < 0$; in which, f1 denotes an effective focal length of the first lens, and f3 denotes an effective focal length of the third lens.

In an embodiment, the telephoto lens satisfies the following relation: $2.5 < f1/CT1 < 4.0$;
in which, f1 denotes the effective focal length of the first lens, and CT1 denotes a center thickness of the first lens.

In an embodiment, the telephoto lens satisfies the following relation: $0.25 \leq CT2/CT1 < 0.5$;
in which, CT1 denotes the center thickness of the first lens, and CT2 denotes a center thickness of the second lens.

In an embodiment, the image-side surface of the third lens is a concave surface, the telephoto lens satisfies the following relation: $-1.2 < SAG32/CT3 < 0$;
in which, SAG32 denotes a sagitta of the image-side surface of the third lens, and CT3 denotes a center thickness of the third lens.

In an embodiment, the object-side surface of the fourth lens is a convex surface, the telephoto lens satisfies the following relation: $|SAG41/CT4| < 0.5$;
in which, SAG41 denotes a sagitta of the object-side surface of the fourth lens, and CT4 denotes a center thickness of the fourth lens.

In an embodiment, an image-side surface of the second lens is a concave surface, the telephoto lens satisfies the following relation: $0 < R1/R4 < 1.0$;
in which, R1 denotes a radius of curvature of the object-side surface of the first lens, and R4 denotes a radius of curvature of the image-side surface of the second lens.

In an embodiment, the telephoto lens satisfies the following relation: $|(R6+R7)/(R6-R7)| \leq 8$;
in which, R6 denotes a radius of curvature of the image-side surface of the third lens, and R7 denotes a radius of curvature of the object-side surface of the fourth lens.

In an embodiment, the telephoto lens satisfies the following relation: $TTL/ImgH \leq 2.5$;
in which, ImgH denotes a half of a diagonal line of an effective pixel area in the imaging plane.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and/or other aspects and advantages of embodiments of the present disclosure will become apparent and more readily appreciated from the following descriptions made with reference to the drawings, in which.

DETAILED DESCRIPTION

Figure 1:
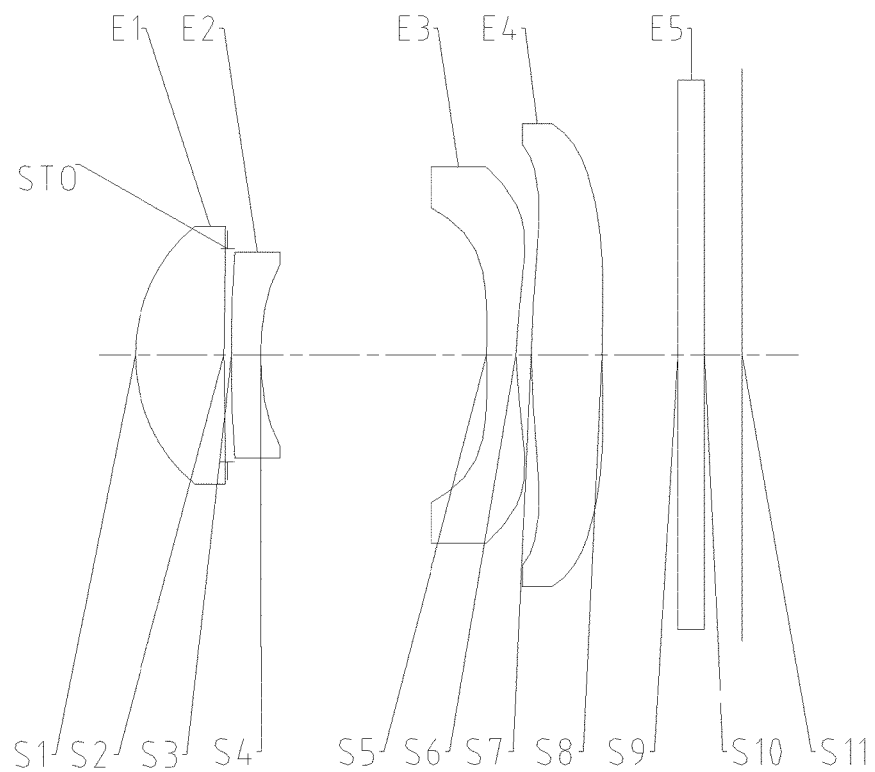
FIG. 1 is a schematic view of a telephoto lens according to embodiment 1.
Figures 2, 3:
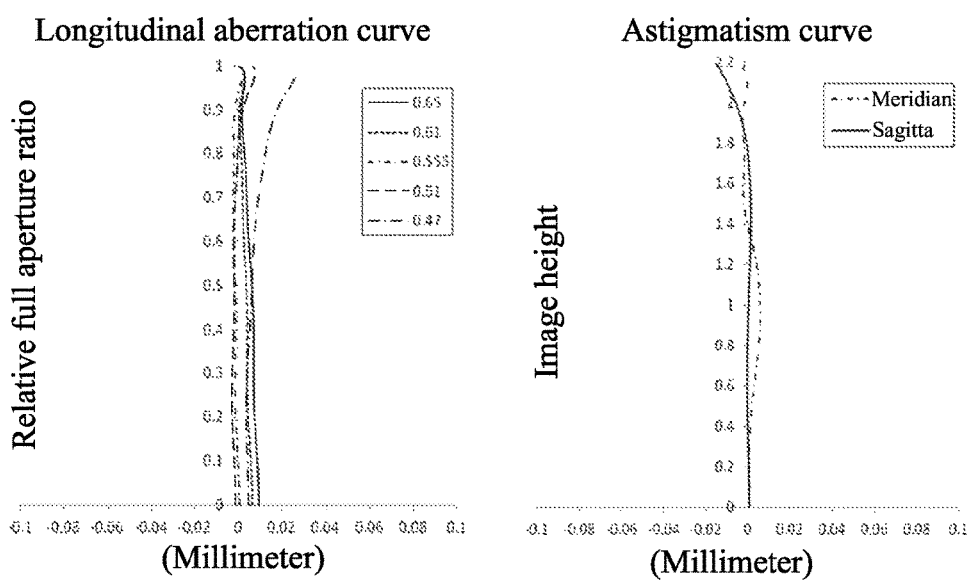
FIG. 2 is a longitudinal aberration curve (mm) of the telephoto lens according to embodiment 1.
FIG. 3 is an astigmatism curve (mm) of the telephoto lens according to embodiment 1.
Figures 4, 5:
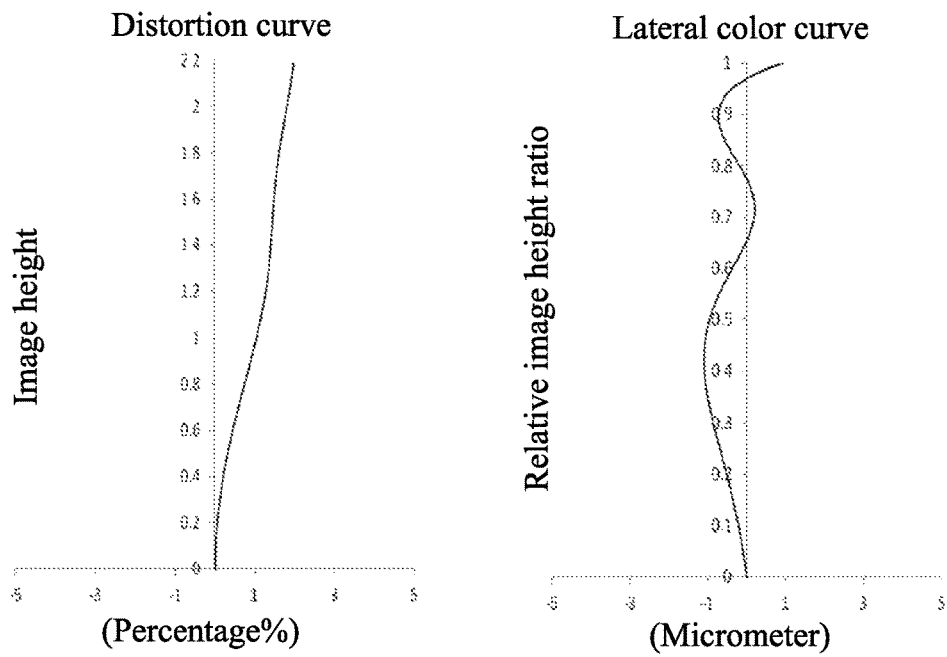
FIG. 4 is a distortion curve (%) of the telephoto lens according to embodiment 1.
FIG. 5 is a lateral color curve (μm) of the telephoto lens according to embodiment 1.
Figure 6:
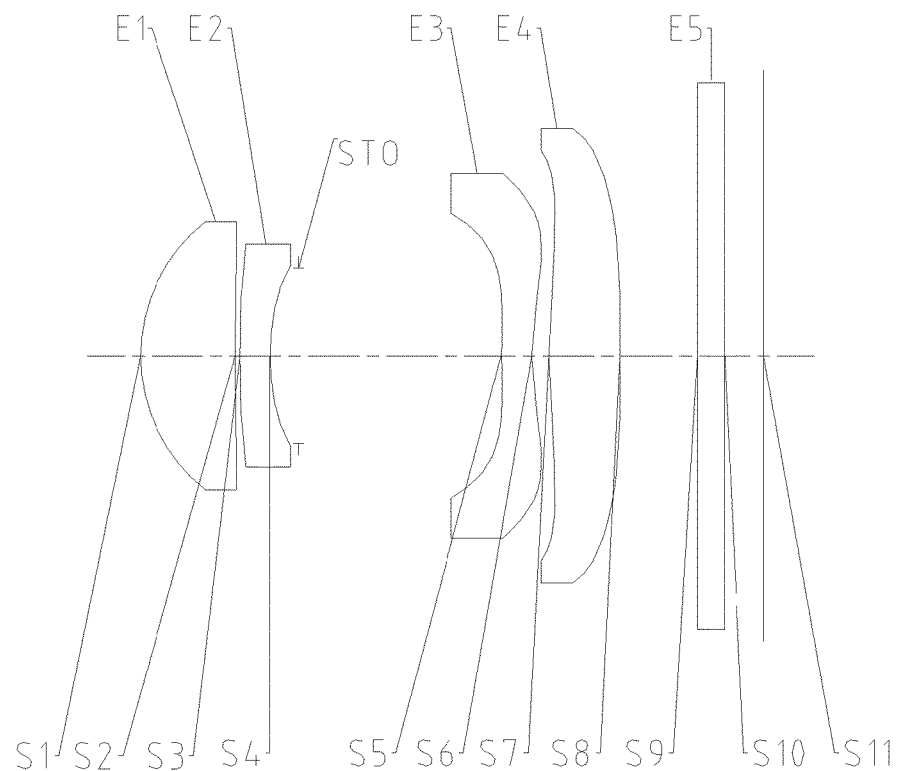
FIG. 6 is a schematic view of a telephoto lens according to embodiment 2.
Figure 7:
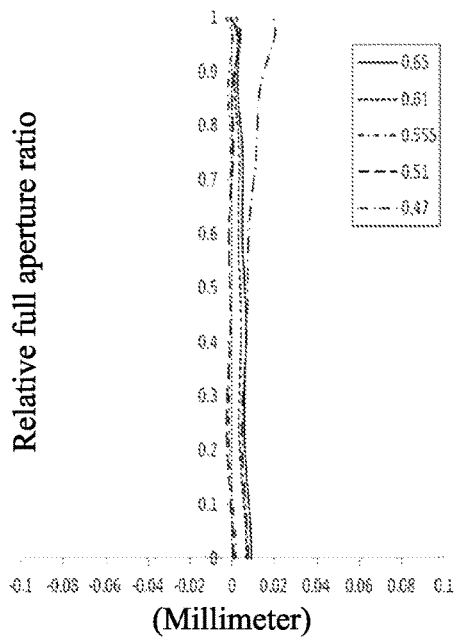
FIG. 7 is a longitudinal aberration curve (mm) of the telephoto lens according to embodiment 2.
Figure 8:
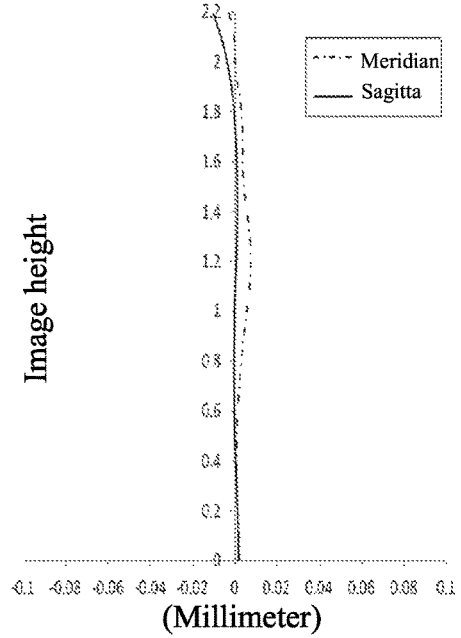
FIG. 8 is an astigmatism curve (mm) of the telephoto lens according to embodiment 2.
Figure 9:
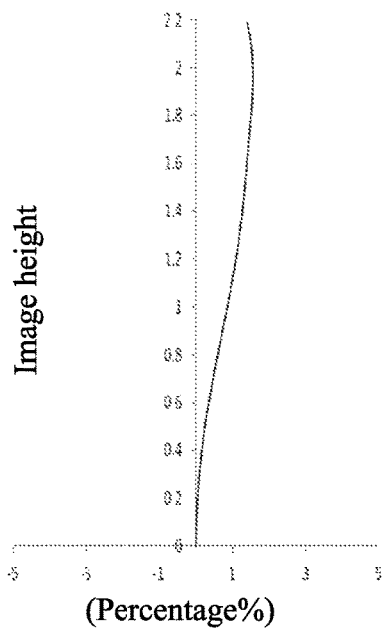
FIG. 9 is a distortion curve (%) of the telephoto lens according to embodiment 2.
Figure 10:
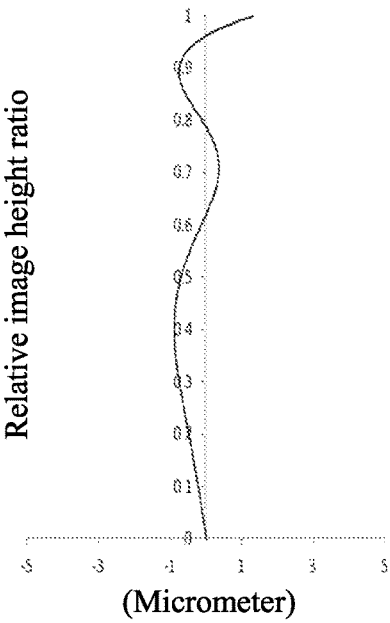
FIG. 10 is a lateral color curve (μm) of the telephoto lens according to embodiment 2.
Figure 11:
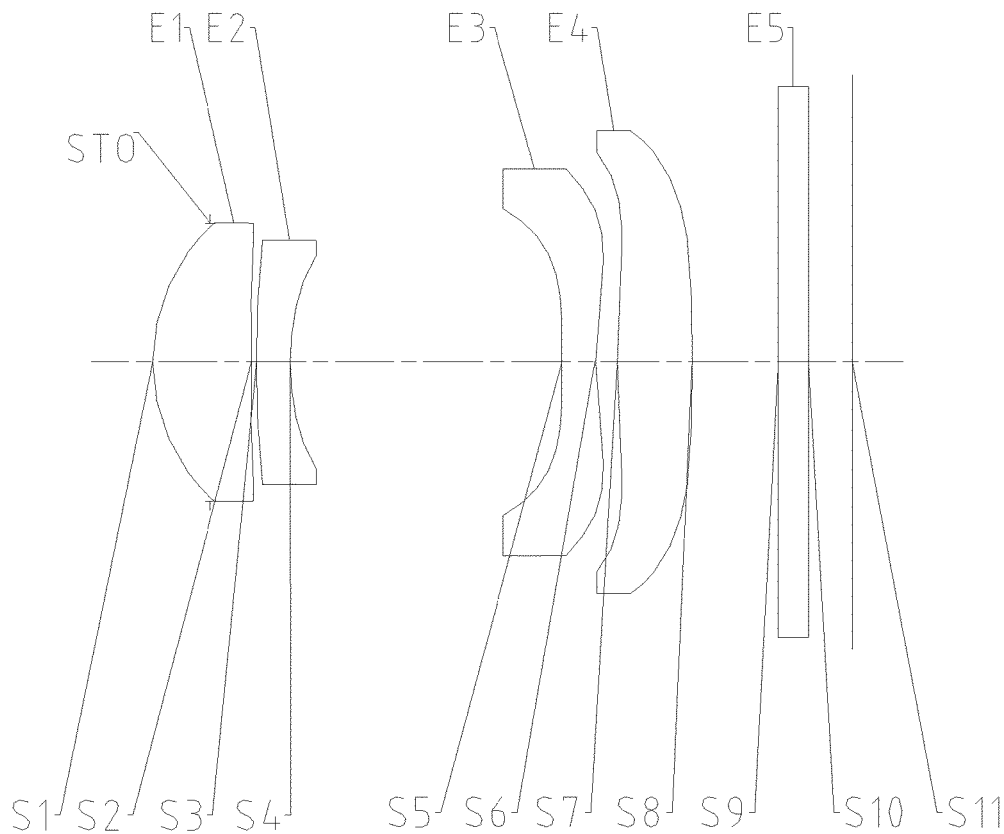
FIG. 11 is a schematic view of a telephoto lens according to embodiment 3.
Figure 12:
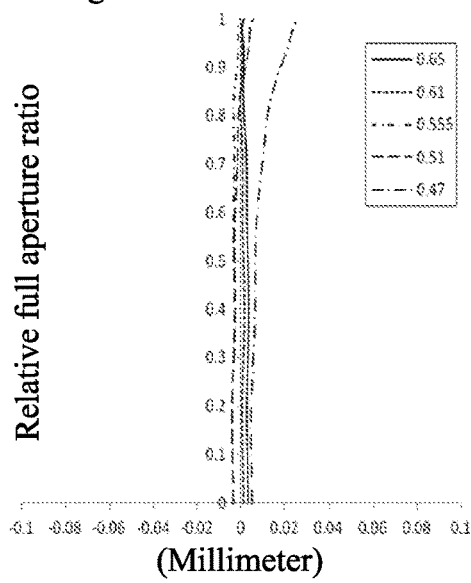
FIG. 12 is a longitudinal aberration curve (mm) of the telephoto lens according to embodiment 3.
Figure 13:
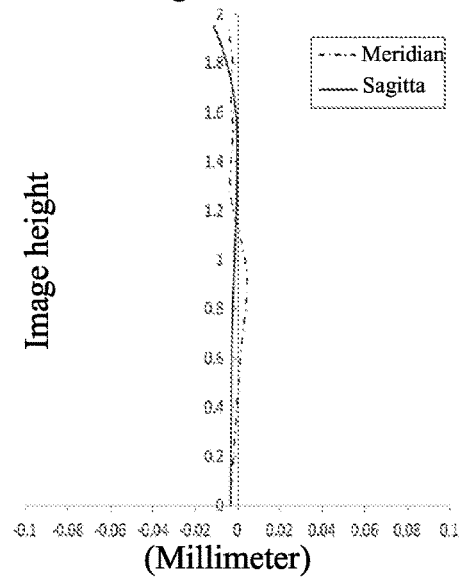
FIG. 13 is an astigmatism curve (mm) of the telephoto lens according to embodiment 3.
Figure 14:
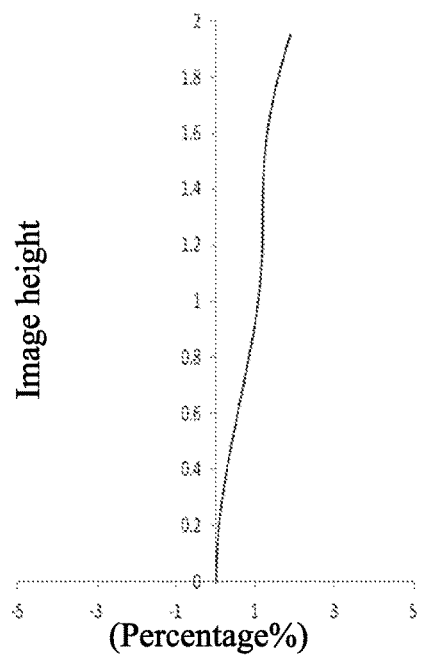
FIG. 14 is a distortion curve (%) of the telephoto lens according to embodiment 3.
Figure 15:
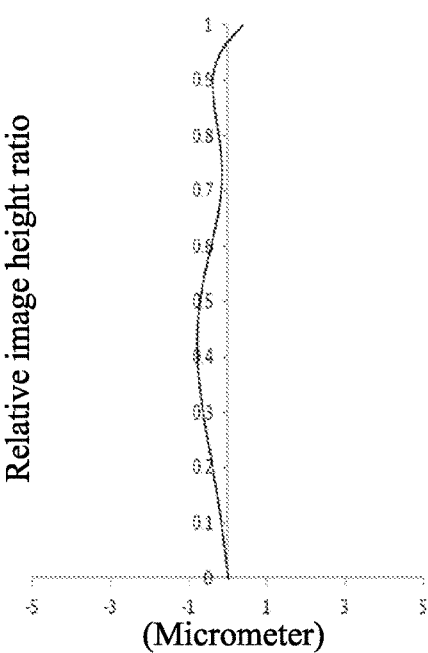
FIG. 15 is a lateral color curve (μm) of the telephoto lens according to embodiment 3.
Figure 16:
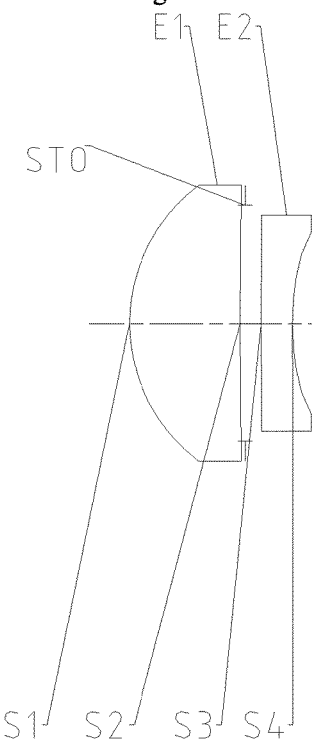
FIG. 16 is a schematic view of a telephoto lens according to embodiment 4.
Figure 16:
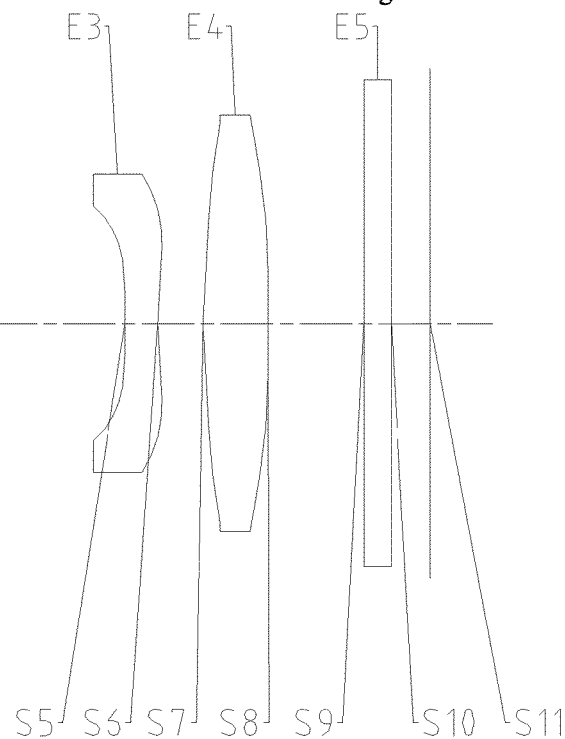
Figure 17:
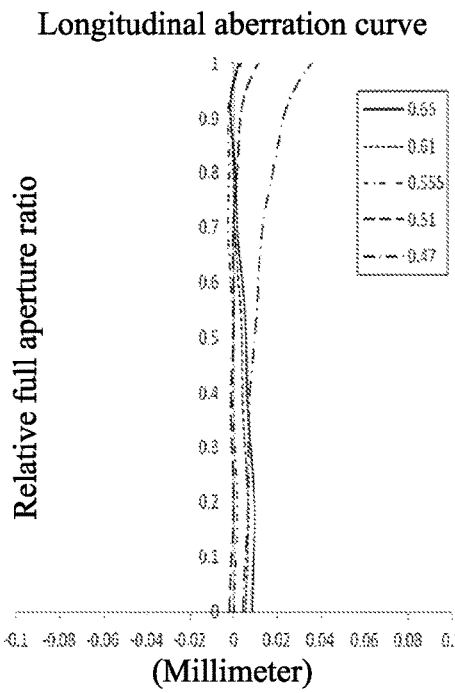
FIG. 17 is a longitudinal aberration curve (mm) of the telephoto lens according to embodiment 4.
Figure 18:
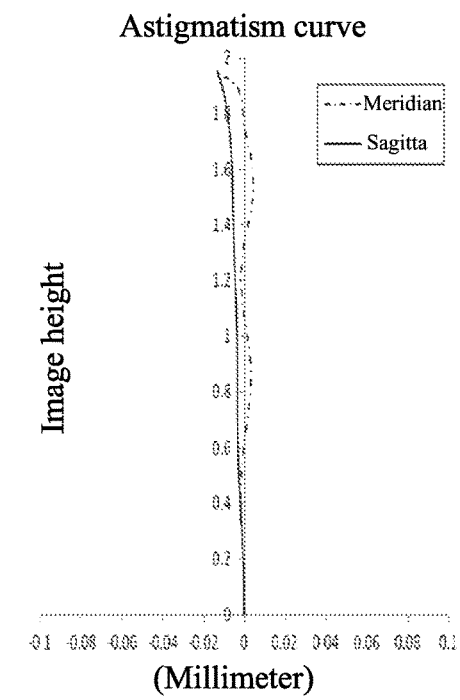
FIG. 18 is an astigmatism curve (mm) of the telephoto lens according to embodiment 4.
Figure 19:
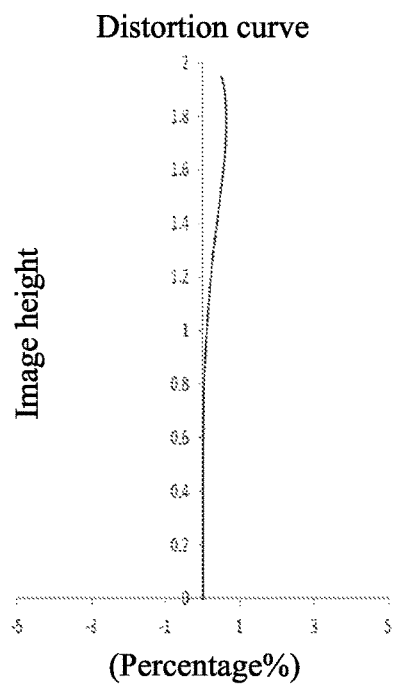
FIG. 19 is a distortion curve (%) of the telephoto lens according to embodiment 4.
Figure 20:
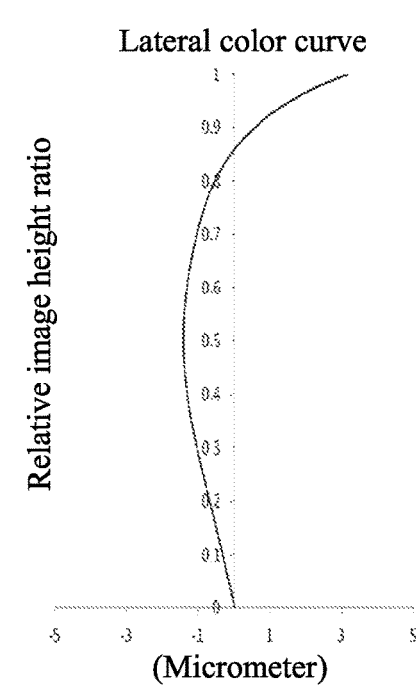
FIG. 20 is a lateral color curve (μm) of the telephoto lens according to embodiment 4.
Figure 21:
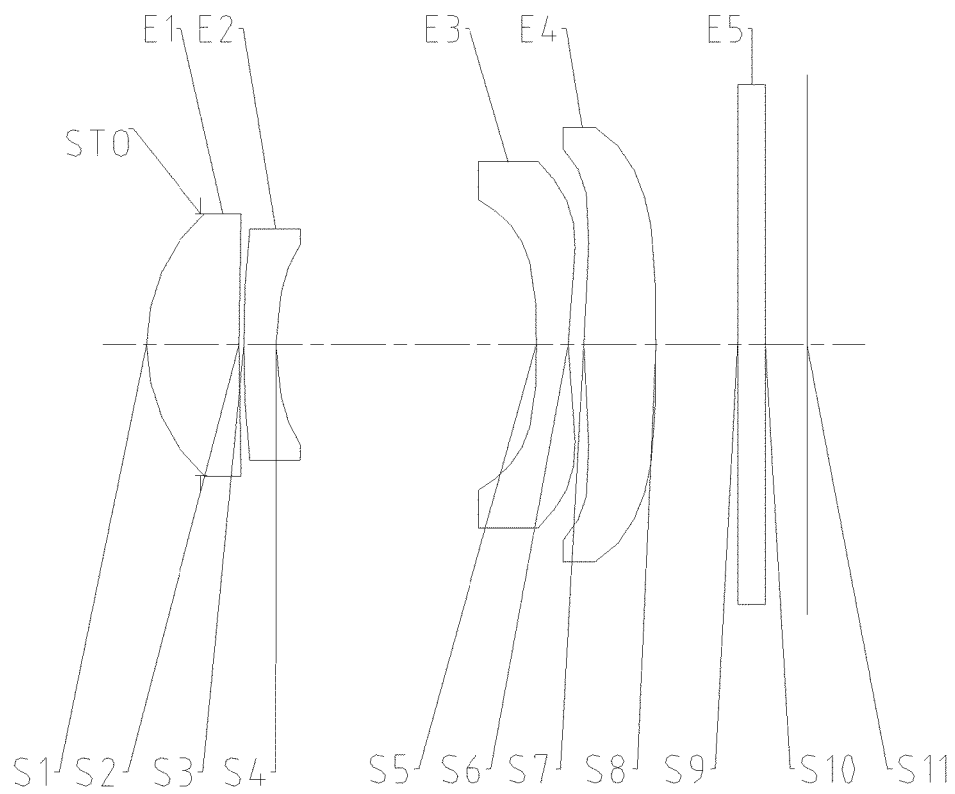
FIG. 21 is a schematic view of a telephoto lens according to embodiment 5.
Figure 22:
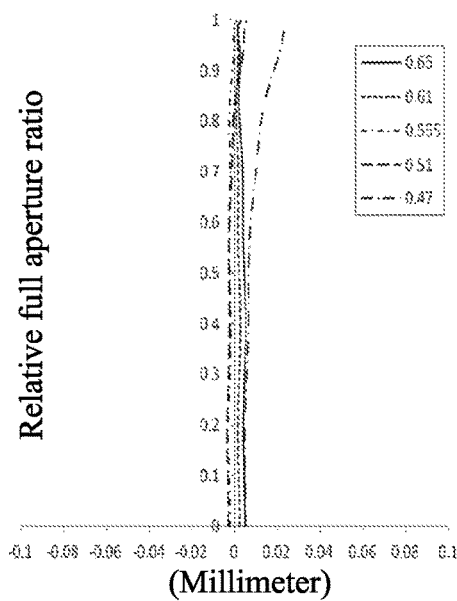
FIG. 22 is a longitudinal aberration curve (mm) of the telephoto lens according to embodiment 5.
Figure 23:
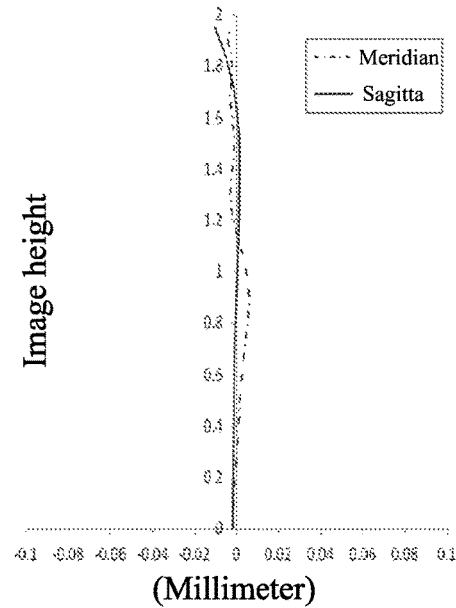
FIG. 23 is an astigmatism curve (mm) of the telephoto lens according to embodiment 5.
Figures 24, 25:
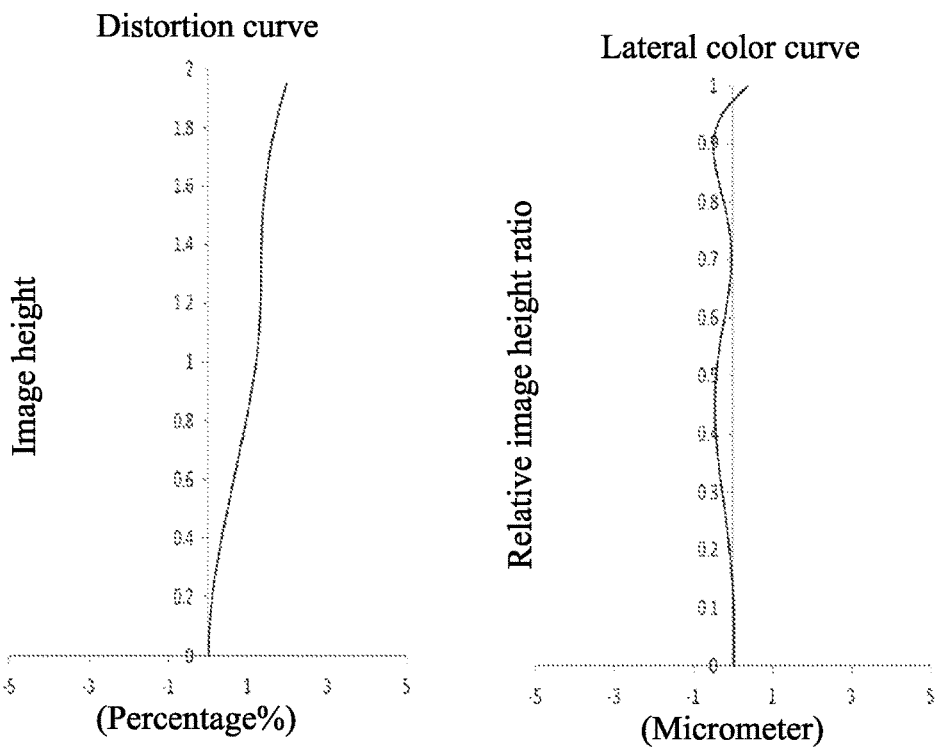
FIG. 24 is a distortion curve (%) of the telephoto lens according to embodiment 5.
FIG. 25 is a lateral color curve (μm) of the telephoto lens according to embodiment 5.
Figure 26:
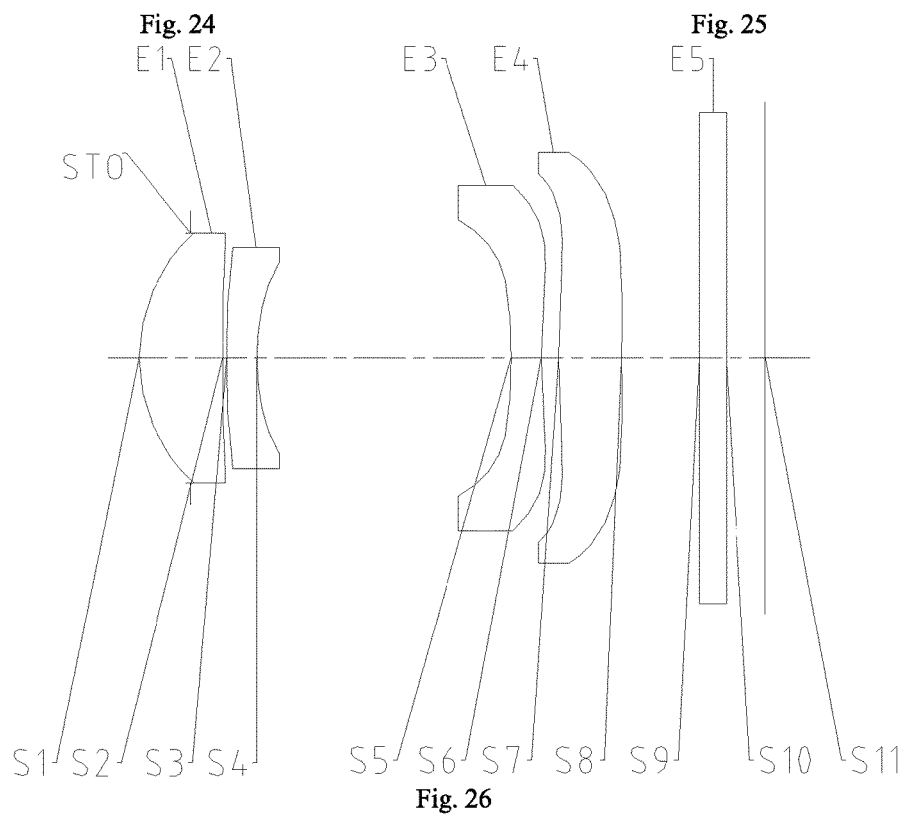
FIG. 26 is a schematic view of a telephoto lens according to embodiment 6.
Figure 27:
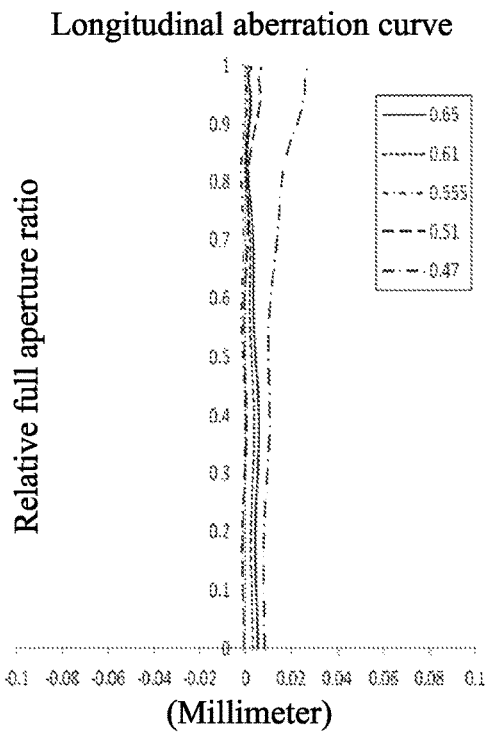
FIG. 27 is a longitudinal aberration curve (mm) of the telephoto lens according to embodiment 6.
Figure 28:
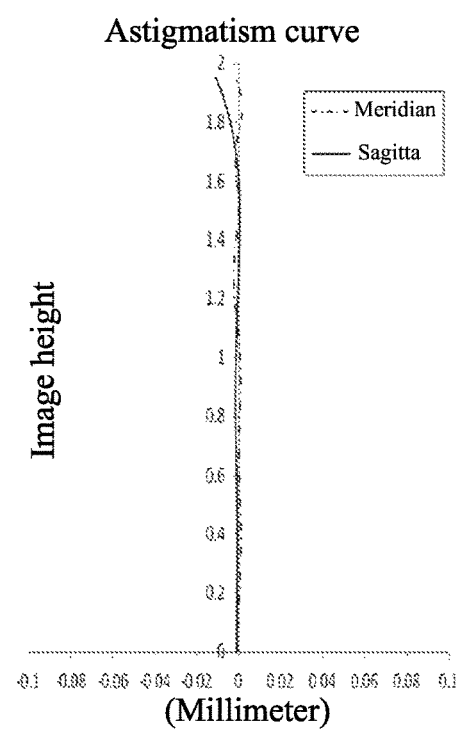
FIG. 28 is an astigmatism curve (mm) of the telephoto lens according to embodiment 6.
Figure 29:
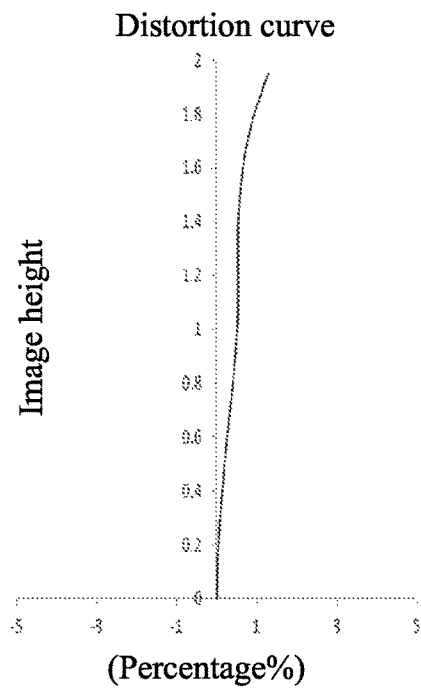
FIG. 29 is a distortion curve (%) of the telephoto lens according to embodiment 6.
Figure 30:
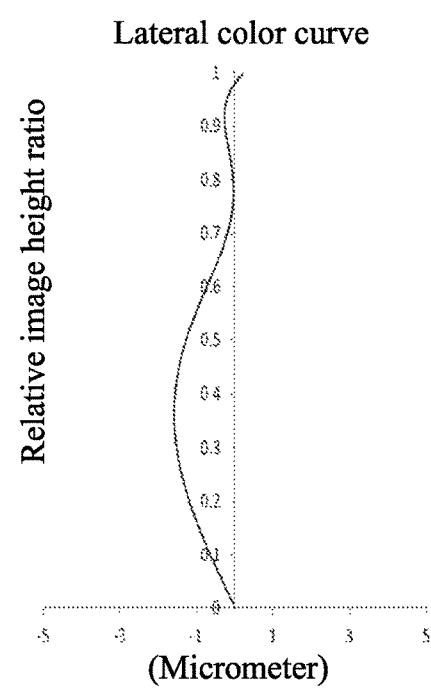
FIG. 30 is a lateral color curve (μm) of the telephoto lens according to embodiment 6.
Figure 31:
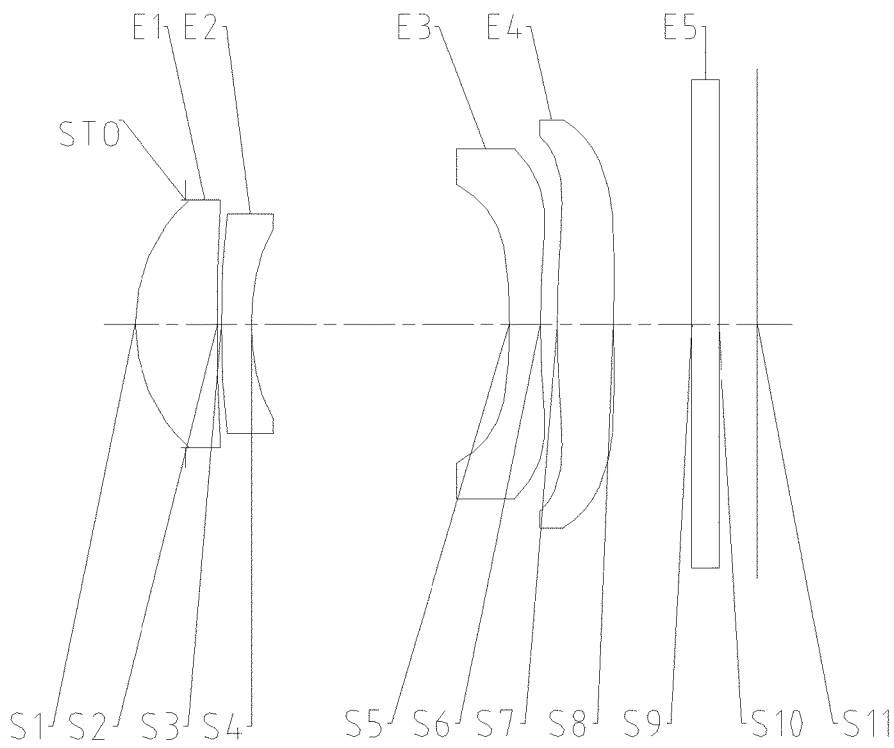
FIG. 31 is a schematic view of a telephoto lens according to embodiment 7.
Figure 32:
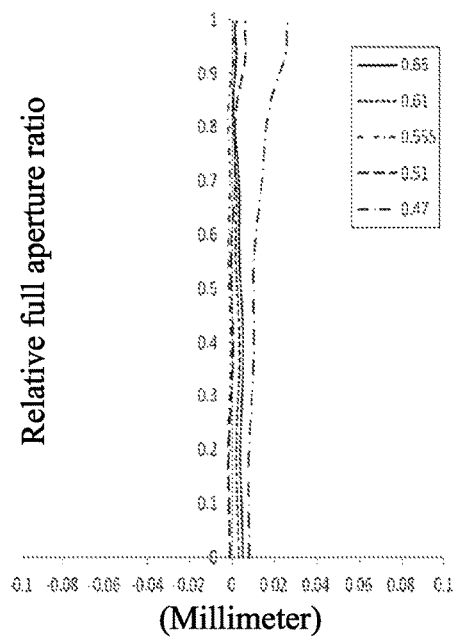
FIG. 32 is a longitudinal aberration curve (mm) of the telephoto lens according to embodiment 7.
Figure 33:
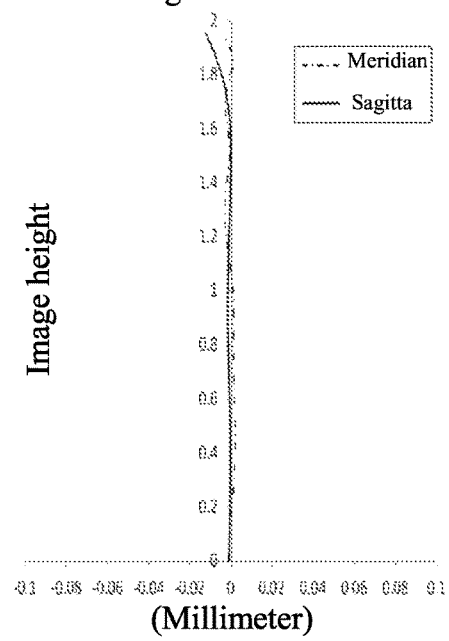
FIG. 33 is an astigmatism curve (mm) of the telephoto lens according to embodiment 7.
Figures 34, 35:
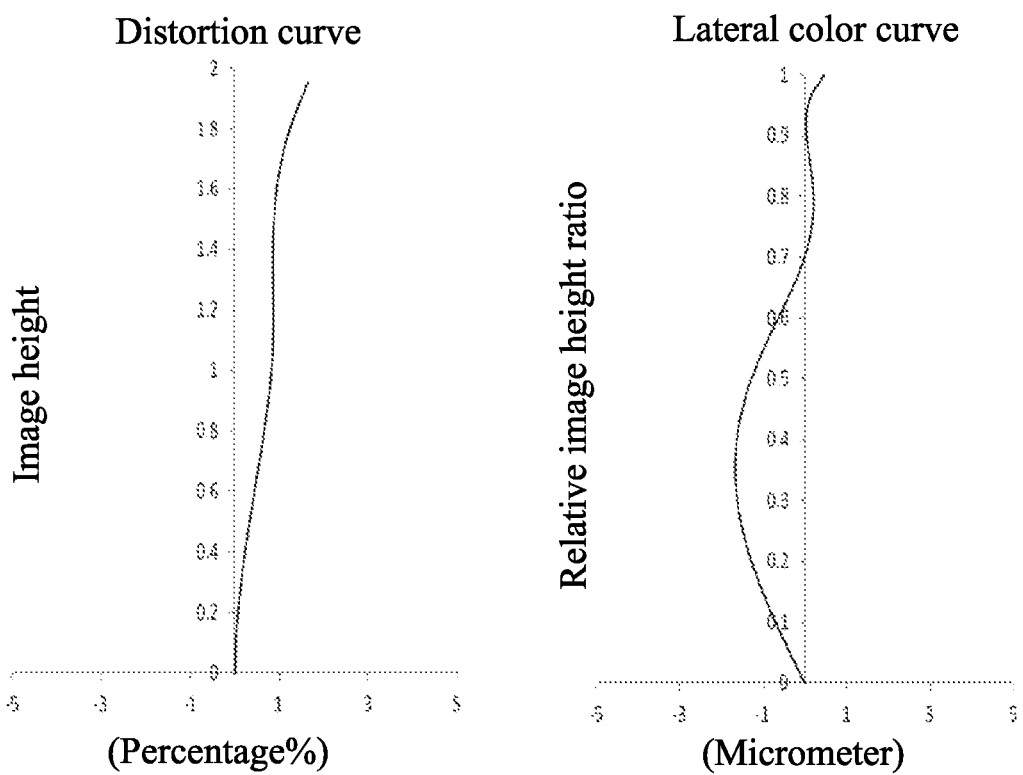
FIG. 34 is a distortion curve (%) of the telephoto lens according to embodiment 7.
FIG. 35 is a lateral color curve (μm) of the telephoto lens according to embodiment 7.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Please refer to FIG. 1, a telephoto lens according to a preferable embodiment of the present disclosure, in sequence from an object side to an image side, includes:

a first lens E1 having a positive refractive power, in which an object-side surface S1 of the first lens E1 is a convex surface, an image-side surface S2 of the first lens E1 is a convex surface;

a second lens E2 having a refractive power;

a third lens E3 having a refractive power, in which the third lens E3 is made of a plastic material, each of an object-side surface S5 and an image-side surface S6 of the third lens E3 is an aspheric surface;

a fourth lens E4 having a refractive power, in which an object-side surface S7 of the fourth lens E4 is a convex surface, the fourth lens E4 is made of a plastic material, and each of the object-side surface S7 and an image-side surface S8 of the fourth lens E4 is an aspheric surface;

in which, the telephoto lens satisfies the following relations:

$0.7 < TTL/f < 0.95$; and $|f4/f| \geq 1.2$;

in which, TTL denotes a distance from the object-side surface S1 of the first lens E1 to an imaging plane S11 along an axis; f denotes an effective focal length of the telephoto lens, f4 denotes an effective focal length of the fourth lens E4.

The telephoto lens satisfying the above-mentioned configuration may be applied to a dual-lens module, and may implement a long-focus characteristic, has a small depth of field, thus highlighting a theme and blurring out a background, which means that the telephoto lens is appropriate to shoot a farther object, thereby acquiring a sharp image. Each optical aberration is corrected effectively, a higher resolution is implemented, miniaturization is ensured, a larger magnification may be acquired if a wide-angle lens is combined, and requirements are satisfied.

Preferably, the second lens E2 has a negative refractive power, and the third lens E3 has a negative refractive power.

Preferably, the telephoto lens satisfies the following relation: −0.7≤f1/f3<0;

in which, f1 denotes an effective focal length of the first lens E1, and f3 denotes an effective focal length of the third lens E3.

The telephoto lens satisfying the above-mentioned requirements may correct the optical aberration effectively, and further improve the resolution of the telephoto lens.

Preferably, the telephoto lens satisfies the following relation: 2.5<f1/CT1<4.0;

in which, f1 denotes the effective focal length of the first lens E1, and CT1 denotes a center thickness of the first lens E1.

The positive refractive power of the telephoto lens satisfying the above-mentioned requirements is in the front relatively, the focal length may be increased, and the long-focus characteristic of the telephoto lens may be ensured.

Preferably, the telephoto lens satisfies the following relation: 0.25≤CT2/CT1<0.5;

in which, CT1 denotes the central thickness of the first lens E1, and CT2 denotes a center thickness of the second lens E2.

The telephoto lens satisfying the above-mentioned requirements facilitates convergence of incident rays, and reduction of an angle of incidence of the incident rays.

Preferably, the image-side surface S6 of the third lens E3 is a concave surface, the telephoto lens satisfies the following relation: −1.2<SAG32/CT3<0;

in which, SAG32 denotes a sagitta of the image-side surface S6 of the third lens E3, and CT3 denotes a center thickness of the third lens E3.

The telephoto lens satisfying the above-mentioned requirements facilitates correction of distortion and field curvature of the telephoto lens, such that the imaging quality is ensured.

Preferably, the object-side surface S7 of the fourth lens E4 is a convex surface, the telephoto lens satisfies the following relation: |SAG41/CT4|<0.5;

in which, SAG41 denotes a sagitta of the object-side surface S7 of the fourth lens E4, and CT4 denotes a center thickness of the fourth lens E4.

The telephoto lens satisfying the above-mentioned requirements may reduce an angle of incidence of a chief ray on the imaging plane, and has a high matching degree for a chip.

Preferably, an image-side surface S4 of the second lens E2 is a concave surface, the telephoto lens satisfies the following relation: 0<R1/R4<1.0;

in which, R1 denotes a radius of curvature of the object-side surface S1 of the first lens E1, and R4 denotes a radius of curvature of the image-side surface S4 of the second lens E2.

The telephoto lens satisfying the above-mentioned requirements may lower the angle of incidence of the rays, so that a field angle of the telephoto lens may be small.

Preferably, the telephoto lens satisfies the following relation: |(R6+R7)/(R6−R7)|≤8;

in which, R6 denotes a radius of curvature of the image-side surface S6 of the third lens E3, and R7 denotes a radius of curvature of the object-side surface S7 of the fourth lens E4.

The telephoto lens satisfying the above-mentioned requirements may correct an edge aberration and make the thickness of the lens uniform relatively, so that an overall image quality from the center to edge is more uniform.

Preferably, the telephoto lens satisfies the following relation: TTL/ImgH≤2.5;

in which, ImgH denotes a half of a diagonal line of an effective pixel area on the imaging plane S11.

The telephoto lens satisfying the above-mentioned requirements may further implement the miniaturization of the telephoto lens.

During imaging, after passing through four lens, the rays pass through an optical filter E5 having an object-side surface S9 and an image-side surface S10 and then form an image on the imaging plane S11.

In some embodiments, each of the first lens E1, the second lens E2, the third lens E3 and the fourth lens E4 is an aspheric lens.

A surface shape of the aspheric surface is decided by the following formula:

$$X = \frac{ch^2}{1 + \sqrt{1 - (k+1)c^2 h^2}} + \sum A i h^i$$

In which, h denotes a height from any point on the aspheric surface to an optical axis, c denotes a curvature of an apex, k denotes a conic constant, Ai denotes an i-th order correction coefficient of the aspheric surface.

Embodiment 1

Referring to FIG. 1 to FIG. 5, in embodiment 1, the telephoto lens satisfies the following conditions shown in Tables 1 to 3:

TABLE 1

| Surface Number | Surface Type | Radius of Curvature | Thickness | Material | Conic Coefficient |
|---|---|---|---|---|---|
| OBJ | Spherical Surface | Infinite | Infinite | — | — |
| S1 | Aspheric Surface | 1.2943 | 0.6980 | 1.54, 56.1 | −0.0549 |
| S2 | Aspheric Surface | −161.2224 | 0.0300 | — | −66.6890 |
| STO | Spherical Surface | Infinite | 0.0300 | — | — |
| S3 | Aspheric Surface | 37.3385 | 0.2300 | 1.64, 23.5 | −99.0000 |
| S4 | Aspheric Surface | 2.1899 | 1.7787 | — | −0.7050 |
| S5 | Aspheric Surface | 12.0290 | 0.2300 | 1.54, 56.1 | −99.0000 |
| S6 | Aspheric Surface | 1.9522 | 0.1212 | — | −12.0663 |
| S7 | Aspheric Surface | 3.9732 | 0.5567 | 1.64, 23.5 | −40.9581 |
| S8 | Aspheric Surface | 11.0404 | 0.5955 | — | −99.0000 |
| S9 | Spherical Surface | Infinite | 0.2099 | 1.52, 64.2 | — |
| S10 | Spherical Surface | Infinite | 0.3000 | — | — |
| S11 | Spherical Surface | Infinite | — | — | — |

TABLE 2

| Surface Number | A4 | A6 | A8 | A10 | A12 | A14 | A16 |
|---|---|---|---|---|---|---|---|
| S1 | 5.1229E−03 | −7.7523E−03 | 7.6375E−02 | −2.0847E−01 | 3.3917E−01 | −2.7973E−01 | 9.9522E−02 |
| S2 | 1.5879E−02 | 1.3587E−01 | −6.5390E−01 | 1.8606E+00 | −3.0564E+00 | 2.6948E+00 | −9.8258E−01 |
| S3 | 5.0294E−02 | 1.1472E−01 | −7.6846E−01 | 2.3722E+00 | −4.2060E+00 | 3.9862E+00 | −1.5814E+00 |
| S4 | 1.3039E−01 | 5.5372E−02 | −5.2843E−02 | 6.0790E−02 | 1.0140E+00 | −2.5180E+00 | 2.0844E+00 |
| S5 | −3.1208E−01 | 1.4948E−01 | −6.2484E−02 | −2.8097E−01 | 5.0908E−01 | −3.9965E−01 | 1.1929E−01 |
| S6 | −2.0965E−01 | 2.7398E−01 | −3.2046E−01 | 2.1386E−01 | −9.6447E−02 | 2.6625E−02 | −3.0969E−03 |
| S7 | −9.3125E−02 | 1.6633E−01 | −1.6472E−01 | 8.8048E−02 | −2.9633E−02 | 6.3802E−03 | −6.9124E−04 |
| S8 | −9.9999E−02 | 7.3225E−02 | −6.6750E−02 | 4.8152E−02 | −2.1276E−02 | 4.9449E−03 | −4.7318E−04 |

TABLE 3

| f1 (mm) | 2.36 | f (mm) | 5.22 |
|---|---|---|---|
| f2 (mm) | −3.62 | TTL (mm) | 4.78 |
| f3 (mm) | −4.30 | HFOV (deg) | 22.37 |
| f4 (mm) | 9.34 | | |

Embodiment 2

Referring to FIG. 6 to FIG. 10, in embodiment 2, the telephoto lens satisfies the following conditions shown in Tables 4 to 6:

TABLE 4

| Surface Number | Surface Type | Radius of Curvature | Thickness | Material | Conic Coefficient |
|---|---|---|---|---|---|
| OBJ | Spherical Surface | Infinite | Infinite | — | — |
| S1 | Aspheric Surface | 1.3000 | 0.7276 | 1.54, 56.1 | −0.1020 |
| S2 | Aspheric Surface | −47.2094 | 0.0374 | — | −66.6890 |
| S3 | Aspheric Surface | 20.3612 | 0.2300 | 1.64, 23.5 | −99.0000 |
| S4 | Aspheric Surface | 2.0442 | 0.2181 | — | −0.8157 |
| STO | Spherical Surface | Infinite | 1.5591 | — | — |
| S5 | Aspheric Surface | 7.0974 | 0.2300 | 1.54, 56.1 | −99.0000 |
| S6 | Aspheric Surface | 1.7163 | 0.1323 | — | −12.0663 |
| S7 | Aspheric Surface | 4.6663 | 0.5429 | 1.64, 23.5 | −40.9581 |
| S8 | Aspheric Surface | 21.3440 | 0.5928 | — | −99.0000 |
| S9 | Spherical Surface | Infinite | 0.2100 | 1.52, 64.2 | — |
| S10 | Spherical Surface | Infinite | 0.3000 | — | — |
| S11 | Spherical Surface | Infinite | — | — | — |

TABLE 5

| Surface Number | A4 | A6 | A8 | A10 | A12 | A14 | A16 |
|---|---|---|---|---|---|---|---|
| S1 | 6.3930E−03 | −1.3076E−02 | 7.3486E−02 | −1.6946E−01 | 2.2583E−01 | −1.5142E−01 | 4.0710E−02 |
| S2 | 3.1102E−02 | 3.4061E−02 | −2.1156E−01 | 6.4573E−01 | −1.0643E+00 | 8.6115E−01 | −2.6843E−01 |
| S3 | 5.5171E−02 | 8.9498E−02 | −6.2055E−01 | 2.0233E+00 | −3.6092E+00 | 3.2648E+00 | −1.1660E+00 |
| S4 | 1.1560E−01 | 2.2275E−01 | −1.4165E+00 | 6.7873E+00 | −1.7200E+01 | 2.2793E+01 | −1.1943E+01 |
| S5 | −3.7826E−01 | 3.0630E−01 | −4.9951E−01 | 5.3014E−01 | −3.6115E−01 | 7.7112E−02 | 1.7748E−02 |
| S6 | −2.0882E−01 | 2.3263E−01 | −2.7441E−01 | 1.9686E−01 | −1.0635E−01 | 3.6242E−02 | −5.0967E−03 |
| S7 | −1.1023E−01 | 2.0491E−01 | −2.1224E−01 | 1.2231E−01 | −4.4312E−02 | 9.9233E−03 | −1.0716E−03 |
| S8 | −1.0787E−01 | 8.5099E−02 | −7.2340E−02 | 5.2411E−02 | −2.4194E−02 | 5.8613E−03 | −5.7933E−04 |

TABLE 6

| f1 (mm) | 2.33 | f (mm) | 5.24 |
|---|---|---|---|
| f2 (mm) | −3.54 | TTL (mm) | 4.78 |
| f3 (mm) | −4.21 | HFOV (deg) | 22.42 |
| f4 (mm) | 9.15 | | |

Embodiment 3

Referring to FIG. 11 to FIG. 15, in embodiment 3, the telephoto lens satisfies the following conditions shown in Tables 7 to 9:

TABLE 7

| Surface Number | Surface Type | Radius of Curvature | Thickness | Material | Conic Coefficient |
|---|---|---|---|---|---|
| OBJ | Spherical Surface | Infinite | Infinite | — | — |
| STO | Spherical Surface | Infinite | −0.3943 | — | — |
| S1 | Aspheric Surface | 1.2968 | 0.6772 | 1.54, 56.1 | −0.0466 |
| S2 | Aspheric Surface | −31.4860 | 0.0350 | — | −66.6890 |
| S3 | Aspheric Surface | 13.4253 | 0.2300 | 1.64, 23.5 | −99.0000 |
| S4 | Aspheric Surface | 1.9319 | 1.8569 | — | −1.6641 |
| S5 | Aspheric Surface | 36.5035 | 0.2300 | 1.54, 56.1 | −99.0000 |
| S6 | Aspheric Surface | 2.0189 | 0.1471 | — | −12.0663 |
| S7 | Aspheric Surface | 5.4740 | 0.5094 | 1.64, 23.5 | −40.9581 |
| S8 | Aspheric Surface | −263.9947 | 0.5886 | — | −99.0000 |
| S9 | Spherical Surface | Infinite | 0.2100 | 1.52, 64.2 | — |
| S10 | Spherical Surface | Infinite | 0.2986 | — | — |
| S11 | Spherical Surface | Infinite | — | — | — |

TABLE 8

| Surface Number | A4 | A6 | A8 | A10 | A12 | A14 | A16 |
|---|---|---|---|---|---|---|---|
| S1 | 4.8283E−03 | −7.3738E−03 | 9.2264E−02 | −2.9263E−01 | 5.2675E−01 | −4.7237E−01 | 1.7693E−01 |
| S2 | 3.4098E−02 | 2.0650E−01 | −1.2621E+00 | 3.8249E+00 | −6.3247E+00 | 5.4404E+00 | −1.8873E+00 |
| S3 | 3.2887E−02 | 2.3546E−01 | −1.5433E+00 | 4.9995E+00 | −8.9709E+00 | 8.3930E+00 | −3.1984E+00 |
| S4 | 1.0283E−01 | 1.2620E−01 | −5.1072E−01 | 2.3333E+00 | −5.2127E+00 | 6.1167E+00 | −2.6807E+00 |
| S5 | −4.4560E−01 | 4.2091E−01 | −5.9693E−01 | 4.5154E−01 | −1.9516E−01 | −2.0661E−02 | 3.9738E−02 |
| S6 | −3.2263E−01 | 5.7599E−01 | −8.9827E−01 | 8.1965E−01 | −4.6091E−01 | 1.4676E−01 | −1.9661E−02 |
| S7 | −9.8582E−02 | 2.0991E−01 | −3.1221E−01 | 2.2630E−01 | −9.0388E−02 | 1.8982E−02 | −1.6869E−03 |
| S8 | −7.5213E−02 | 3.5446E−02 | −3.7715E−02 | 2.2067E−02 | −6.7129E−03 | 9.0330E−04 | −6.9601E−05 |

TABLE 9

| | | | |
|---|---|---|---|
| f1 (mm) | 2.30 | f (mm) | 5.29 |
| f2 (mm) | −3.53 | TTL (mm) | 4.78 |
| f3 (mm) | −3.92 | HFOV (deg) | 19.86 |
| f4 (mm) | 8.33 | | |

TABLE 12

| | | | |
|---|---|---|---|
| f1 (mm) | 2.35 | f (mm) | 5.27 |
| f2 (mm) | −3.24 | TTL (mm) | 4.79 |
| f3 (mm) | −4.64 | HFOV (deg) | 20.19 |
| f4 (mm) | 8.21 | | |

Embodiment 4

Referring to FIG. 16 to FIG. 20, in embodiment 4, the telephoto lens satisfies the following conditions shown in Tables 10 to 12:

Embodiment 5

Referring to FIG. 21 to FIG. 25, in embodiment 5, the telephoto lens satisfies the following conditions shown in Tables 13 to 15:

TABLE 10

| Surface Number | Surface Type | Radius of Curvature | Thickness | Material | Conic Coefficient |
|---|---|---|---|---|---|
| OBJ | Spherical Surface | Infinite | Infinite | — | — |
| S1 | Aspheric Surface | 1.2987 | 0.8499 | 1.54, 56.1 | −0.1081 |
| S2 | Aspheric Surface | −88.4733 | 0.0377 | — | −16.3270 |
| STO | Spherical Surface | Infinite | 0.1219 | — | — |
| S3 | Aspheric Surface | −18.8434 | 0.2400 | 1.65/21.5 | 5.0000 |
| S4 | Aspheric Surface | 2.4077 | 1.2000 | — | −0.6088 |
| S5 | Aspheric Surface | 22.6046 | 0.2500 | 1.54, 56.1 | 5.0000 |
| S6 | Aspheric Surface | 2.2671 | 0.3472 | — | −18.6875 |
| S7 | Aspheric Surface | 4.2978 | 0.4949 | 1.65/21.5 | −65.1306 |
| S8 | Aspheric Surface | 20.2967 | 0.7348 | — | −99.0000 |
| S9 | Spherical Surface | Infinite | 0.2100 | 1.52, 64.2 | — |
| S10 | Spherical Surface | Infinite | 0.3000 | — | — |
| S11 | Spherical Surface | Infinite | — | — | — |

TABLE 13

| Surface Number | Surface Type | Radius of Curvature | Thickness | Material | Conic Coefficient |
|---|---|---|---|---|---|
| OBJ | Spherical Surface | Infinite | Infinite | — | — |
| STO | Spherical Surface | Infinite | −0.3943 | — | — |
| S1 | Aspheric Surface | 1.2945 | 0.6710 | 1.54, 56.1 | −0.0468 |
| S2 | Aspheric Surface | −30.6008 | 0.0358 | — | −66.6890 |
| S3 | Aspheric Surface | 13.2502 | 0.2300 | 1.64, 23.5 | −99.0000 |
| S4 | Aspheric Surface | 1.9219 | 1.8849 | — | −1.5814 |
| S5 | Aspheric Surface | −96.7686 | 0.2300 | 1.54, 56.1 | −99.0000 |
| S6 | Aspheric Surface | 1.9036 | 0.1133 | — | −13.1116 |
| S7 | Aspheric Surface | 4.2889 | 0.5190 | 1.64, 23.5 | −40.9581 |
| S8 | Aspheric Surface | −88.0640 | 0.5900 | — | −99.0000 |
| S9 | Spherical Surface | Infinite | 0.2061 | 1.52, 64.2 | — |
| S10 | Spherical Surface | Infinite | 0.3000 | — | — |
| S11 | Spherical Surface | Infinite | — | — | — |

TABLE 11

| Surface Number | A4 | A6 | A8 | A10 | A12 | A14 | A16 |
|---|---|---|---|---|---|---|---|
| S1 | 3.1592E−04 | 7.6704E−03 | −2.5094E−02 | 6.3036E−02 | −8.1177E−02 | 5.4556E−02 | −1.4613E−02 |
| S2 | 6.1375E−03 | 3.8063E−02 | −5.1044E−02 | 1.2614E−02 | 5.2752E−02 | −6.6573E−02 | 2.3597E−02 |
| S3 | 3.5810E−02 | 8.4910E−02 | −2.3343E−01 | 3.1489E−01 | −1.7294E−01 | −5.5521E−02 | 7.4686E−02 |
| S4 | 1.1593E−01 | 5.1436E−02 | 5.7191E−01 | −3.3907E+00 | 1.0592E+01 | −1.5817E+01 | 9.6557E+00 |
| S5 | −4.4418E−01 | 6.6329E−02 | 8.3871E−01 | −3.6387E+00 | 6.3545E+00 | −5.4047E+00 | 1.8377E+00 |
| S6 | −3.0726E−01 | 3.5484E−01 | −5.5298E−01 | 5.5701E−01 | −3.3401E−01 | 1.1276E−01 | −1.6374E−02 |
| S7 | −5.8581E−02 | 9.3486E−02 | −8.5475E−02 | 4.9433E−02 | −1.7826E−02 | 3.9722E−03 | −4.3185E−04 |
| S8 | −1.2132E−01 | 1.0697E−01 | −7.8804E−02 | 5.0237E−02 | −2.3595E−02 | 6.5730E−03 | −7.7311E−04 |

TABLE 14

| Surface Number | A4 | A6 | A8 | A10 | A12 | A14 | A16 |
|---|---|---|---|---|---|---|---|
| S1 | 4.8816E−03 | −8.9506E−03 | 1.0359E−01 | −3.3289E−01 | 5.9937E−01 | −5.3859E−01 | 2.0138E−01 |
| S2 | 3.2683E−02 | 2.2264E−01 | −1.3657E+00 | 4.1203E+00 | −6.7590E+00 | 5.7635E+00 | −1.9804E+00 |
| S3 | 3.3399E−02 | 2.5466E−01 | −1.6856E+00 | 5.4571E+00 | −9.7395E+00 | 9.0625E+00 | −3.4349E+00 |
| S4 | 1.0426E−01 | 1.3484E−01 | −5.8226E−01 | 2.6302E+00 | −5.8570E+00 | 6.8555E+00 | −3.0241E+00 |
| S5 | −4.8886E−01 | 5.6732E−01 | −7.8780E−01 | 6.1917E−01 | −3.4228E−01 | 9.7859E−02 | −3.1589E−03 |
| S6 | −3.7313E−01 | 6.7826E−01 | −9.6915E−01 | 8.1624E−01 | −4.3067E−01 | 1.3144E−01 | −1.7146E−02 |
| S7 | −9.8207E−02 | 1.6576E−01 | −2.0374E−01 | 1.0276E−01 | −1.5784E−02 | −4.6571E−03 | 1.3758E−03 |
| S8 | −5.7711E−02 | −2.0756E−03 | 7.8462E−03 | −9.7362E−03 | 5.8636E−03 | −1.7826E−03 | 1.6177E−04 |

TABLE 15

| f1 (mm) | 2.29 | f (mm) | 5.29 |
|---|---|---|---|
| f2 (mm) | −3.52 | TTL (mm) | 4.78 |
| f3 (mm) | −3.42 | HFOV (deg) | 19.87 |
| f4 (mm) | 6.36 | | |

TABLE 18

| f1 (mm) | 2.36 | f (mm) | 5.33 |
|---|---|---|---|
| f2 (mm) | −3.80 | TTL (mm) | 4.78 |
| f3 (mm) | −6.39 | HFOV (deg) | 19.86 |
| f4 (mm) | 532.78 | | |

Embodiment 6

Referring to FIG. 26 to FIG. 30, in embodiment 6, the telephoto lens satisfies the following conditions shown in Tables 16 to 18:

TABLE 16

| Surface Number | Surface Type | Radius of Curvature | Thickness | Material | Conic Coefficient |
|---|---|---|---|---|---|
| OBJ | Spherical Surface | Infinite | Infinite | — | — |
| STO | Spherical Surface | Infinite | −0.3943 | — | — |
| S1 | Aspheric Surface | 1.3072 | 0.6415 | 1.54, 56.1 | −0.0470 |
| S2 | Aspheric Surface | −65.8235 | 0.0300 | — | −66.6890 |
| S3 | Aspheric Surface | 14.8498 | 0.2300 | 1.64, 23.5 | −99.0000 |
| S4 | Aspheric Surface | 2.0914 | 1.9385 | — | −1.4381 |
| S5 | Aspheric Surface | −7.2728 | 0.2300 | 1.54, 56.1 | −99.0000 |
| S6 | Aspheric Surface | 6.7745 | 0.1334 | — | 5.0000 |
| S7 | Aspheric Surface | 9.4597 | 0.4787 | 1.64, 23.5 | −40.9581 |
| S8 | Aspheric Surface | 9.5347 | 0.5904 | — | −99.0000 |
| S9 | Spherical Surface | Infinite | 0.2075 | 1.52, 64.2 | — |
| S10 | Spherical Surface | Infinite | 0.3000 | — | — |
| S11 | Spherical Surface | Infinite | — | — | — |

Embodiment 7

Referring to FIG. 31 to FIG. 35, in embodiment 7, the telephoto lens satisfies the following conditions shown in Tables 19 to 21:

TABLE 19

| Surface Number | Surface Type | Radius of Curvature | Thickness | Material | Conic Coefficient |
|---|---|---|---|---|---|
| OBJ | Spherical Surface | Infinite | Infinite | — | — |
| STO | Spherical Surface | Infinite | −0.3896 | — | — |
| S1 | Aspheric Surface | 1.3108 | 0.6355 | 1.54, 56.1 | −0.0463 |
| S2 | Aspheric Surface | −110.3930 | 0.0300 | — | −66.6890 |
| S3 | Aspheric Surface | 16.3664 | 0.2300 | 1.64, 23.5 | −99.0000 |
| S4 | Aspheric Surface | 2.1491 | 1.9792 | — | −1.2566 |
| S5 | Aspheric Surface | −7.5801 | 0.2376 | 1.54, 56.1 | −99.0000 |
| S6 | Aspheric Surface | 8.3338 | 0.1307 | — | 5.0000 |
| S7 | Aspheric Surface | 10.7393 | 0.4292 | 1.64, 23.5 | −40.9581 |
| S8 | Aspheric Surface | 9.0943 | 0.6001 | — | −99.0000 |
| S9 | Spherical Surface | Infinite | 0.2077 | 1.52, 64.2 | — |
| S10 | Spherical Surface | Infinite | 0.3000 | — | — |
| S11 | Spherical Surface | Infinite | — | — | — |

TABLE 17

| Surface Number | A4 | A6 | A8 | A10 | A12 | A14 | A16 |
|---|---|---|---|---|---|---|---|
| S1 | 5.2547E−03 | −1.3082E−02 | 1.4060E−01 | −4.6730E−01 | 8.3951E−01 | −7.4974E−01 | 2.7366E−01 |
| S2 | 1.8681E−02 | 3.0973E−01 | −1.7670E+00 | 5.0875E+00 | −7.9498E+00 | 6.4156E+00 | −2.0697E+00 |
| S3 | 3.8812E−02 | 3.0397E−01 | −1.9449E+00 | 6.0166E+00 | −1.0155E+01 | 8.8837E+00 | −3.1441E+00 |
| S4 | 1.1427E−01 | 1.0086E−01 | −4.7031E−01 | 2.1552E+00 | −4.6195E+00 | 5.1250E+00 | −2.0918E+00 |
| S5 | −1.2127E−01 | −2.1280E−01 | 4.8414E−02 | 1.4611E−01 | −1.3211E−01 | −5.4100E−02 | 5.6849E−02 |
| S6 | 7.9093E−02 | −2.5344E−01 | 2.4962E−02 | 2.3958E−01 | −2.7033E−01 | 1.2076E−01 | −1.9506E−02 |
| S7 | −2.1409E−02 | 1.1280E−01 | −3.1947E−01 | 3.6970E−01 | −2.3720E−01 | 7.9828E−02 | −1.1057E−02 |
| S8 | −1.2973E−01 | 1.1530E−01 | −1.4234E−01 | 1.1961E−01 | −6.0762E−02 | 1.6545E−02 | −1.9025E−03 |

TABLE 20

| Surface Number | A4 | A6 | A8 | A10 | A12 | A14 | A16 |
|---|---|---|---|---|---|---|---|
| S1 | 5.2822E−03 | −1.2291E−02 | 1.3997E−01 | −4.7205E−01 | 8.5450E−01 | −7.6695E−01 | 2.8067E−01 |
| S2 | 2.8695E−03 | 4.3625E−01 | −2.3543E+00 | 6.6389E+00 | −1.0273E+01 | 8.2483E+00 | −2.6600E+00 |
| S3 | 2.9316E−02 | 4.3941E−01 | −2.6435E+00 | 7.9993E+00 | −1.3325E+01 | 1.1553E+01 | −4.0618E+00 |
| S4 | 1.1537E−01 | 1.4380E−01 | −8.0572E−01 | 3.4436E+00 | −7.3864E+00 | 8.2427E+00 | −3.5362E+00 |
| S5 | −1.1502E−01 | −1.6530E−01 | −3.9467E−02 | 2.0072E−01 | −1.1516E−01 | −7.4208E−02 | 5.7015E−02 |
| S6 | 1.2473E−01 | −2.7517E−01 | 2.7658E−02 | 2.2852E−01 | −2.4519E−01 | 1.0485E−01 | −1.6326E−01 |
| S7 | 3.3971E−02 | 1.1444E−02 | −1.7289E−01 | 2.2672E−01 | −1.5054E−01 | 5.0782E−02 | −6.9371E−03 |
| S8 | −1.0045E−01 | 6.6099E−02 | −9.0644E−02 | 8.6536E−02 | −4.8847E−02 | 1.4393E−02 | −1.7617E−03 |

TABLE 21

| f1 (mm) | 2.38 | f (mm) | 5.31 |
|---|---|---|---|
| f2 (mm) | −3.86 | TTL (mm) | 4.78 |
| f3 (mm) | −7.23 | HFOV (deg) | 19.85 |
| f4 (mm) | −102.60 | | |

In embodiments 1 to 7, each conditional expression satisfies conditions shown in the following table.

| Conditional Expression | Embodiment 1 | Embodiment 2 | Embodiment 3 | Embodiment 4 | Embodiment 5 | Embodiment 6 | Embodiment 7 |
|---|---|---|---|---|---|---|---|
| TTL/f | 0.92 | 0.91 | 0.90 | 0.91 | 0.90 | 0.90 | 0.90 |
| |f4/f| | 1.79 | 1.75 | 1.57 | 1.56 | 1.20 | 100.00 | 19.32 |
| f1/f3 | −0.55 | −0.55 | −0.59 | −0.51 | −0.67 | −0.37 | −0.33 |
| f1/CT1 | 3.37 | 3.20 | 3.39 | 2.77 | 3.42 | 3.67 | 3.74 |
| CT2/CT1 | 0.33 | 0.32 | 0.34 | 0.28 | 0.34 | 0.36 | 0.36 |
| SAG32/CT3 | −1.01 | −0.95 | −0.89 | −0.48 | −0.94 | −0.93 | −0.84 |
| |SAG41/CT4| | −0.12 | −0.11 | −0.27 | 0.26 | −0.29 | −0.32 | −0.31 |
| R1/R4 | 0.59 | 0.64 | 0.67 | 0.54 | 0.67 | 0.63 | 0.61 |
| |(R6 + R7)/(R6 − R7)| | 2.93 | 2.16 | 2.17 | 3.23 | 2.60 | 6.05 | 7.93 |
| TTL/ImgH | 2.18 | 2.18 | 2.45 | 2.45 | 2.45 | 2.45 | 2.45 |

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance. Thus, the feature defined with "first" and "second" may comprise one or more this feature. In the description of the present disclosure, the term "a plurality of" means two or more than two, unless specified otherwise.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A telephoto lens, in sequence from an object side to an image side, comprising:
   a first lens having a positive refractive power, wherein an object-side surface of the first lens is a convex surface, an image-side surface of the first lens is a convex surface;
   a second lens having a refractive power;
   a third lens having a refractive power, wherein the third lens is made of a plastic material, each of an object-side surface and an image-side surface of the third lens is an aspheric surface;
   a fourth lens having a refractive power, wherein an object-side surface of the fourth lens is a convex surface, the fourth lens is made of a plastic material, and each of the object-side surface and an image-side surface of the fourth lens is an aspheric surface;
   wherein, the telephoto lens satisfies the following relations:

$0.7 < TTL/f < 0.95$; and $|f4/f| \geq 1.2$;

wherein, TTL denotes a distance from the object-side surface of the first lens to an imaging plane along an axis; f denotes an effective focal length of the telephoto lens, and f4 denotes an effective focal length of the fourth lens.

2. The telephoto lens according to claim 1, wherein the second lens has a negative refractive power, and the third lens has a negative refractive power.

3. The telephoto lens according to claim 1, wherein the telephoto lens satisfies the following relation: $-0.7 \leq f1/f3 < 0$;
   wherein, f1 denotes an effective focal length of the first lens, and f3 denotes an effective focal length of the third lens.

4. The telephoto lens according to claim 1, wherein the telephoto lens satisfies the following relation: $2.5 < f1/CT1 < 4.0$;

wherein, f1 denotes the effective focal length of the first lens, and CT1 denotes a center thickness of the first lens.

5. The telephoto lens according to claim 1, wherein the telephoto lens satisfies the following relation: $0.25 \leq CT2/CT1 < 0.5$;

wherein, CT1 denotes the center thickness of the first lens, and CT2 denotes a center thickness of the second lens.

6. The telephoto lens according to claim 1, wherein the image-side surface of the third lens is a concave surface, the telephoto lens satisfies the following relation: $-1.2 < SAG32/CT3 < 0$;

wherein, SAG32 denotes a sagitta of the image-side surface of the third lens, and CT3 denotes a center thickness of the third lens.

7. The telephoto lens according to claim 1, wherein the object-side surface of the fourth lens is a convex surface, the telephoto lens satisfies the following relation: $|SAG41/CT4| < 0.5$;

wherein, SAG41 denotes a sagitta of the object-side surface of the fourth lens, and CT4 denotes a center thickness of the fourth lens.

8. The telephoto lens according to claim 1, wherein an image-side surface of the second lens is a concave surface, the telephoto lens satisfies the following relation: $0 < R1/R4 < 1.0$;

wherein, R1 denotes a radius of curvature of the object-side surface of the first lens, and R4 denotes a radius of curvature of the image-side surface of the second lens.

9. The telephoto lens according to claim 1, wherein the telephoto lens satisfies the following relation: $|(R6+R7)/(R6-R7)| \leq 8$;

wherein, R6 denotes a radius of curvature of the image-side surface of the third lens, and R7 denotes a radius of curvature of the object-side surface of the fourth lens.

10. The telephoto lens according to claim 1, wherein the telephoto lens satisfies the following relation: $TTL/ImgH \leq 2.5$;

wherein, ImgH denotes a half of a diagonal line of an effective pixel area in the imaging plane.

* * * * *